(12) United States Patent
O'Daniel

(10) Patent No.: US 8,668,154 B2
(45) Date of Patent: Mar. 11, 2014

(54) LAWN MOWER AND FERTILIZER SPREADER COMBINATION

(76) Inventor: Harold O'Daniel, Corsicana, TX (US)

( * ) Notice: Subject to any disclaimer, the term of this patent is extended or adjusted under 35 U.S.C. 154(b) by 785 days.

(21) Appl. No.: 12/906,650

(22) Filed: Oct. 18, 2010

(65) Prior Publication Data

US 2012/0090287 A1   Apr. 19, 2012

(51) Int. Cl.
*A01G 25/09* (2006.01)
*A01C 3/06* (2006.01)
*A01C 7/00* (2006.01)
*A01C 17/00* (2006.01)

(52) U.S. Cl.
USPC ............... 239/1; 239/661; 239/663; 239/681; 239/683; 239/684

(58) Field of Classification Search
USPC .............. 239/1, 650, 661, 663, 681, 683, 684
See application file for complete search history.

(56) References Cited

U.S. PATENT DOCUMENTS

| | | | |
|---|---|---|---|
| 2,627,364 A * | 2/1953 | Schafler et al. | 222/267 |
| 3,102,375 A * | 9/1963 | Troka et al. | 56/255 |
| 4,807,904 A | 2/1989 | Kamlukin et al. | |
| 5,108,038 A * | 4/1992 | Palladino et al. | 239/661 |
| 5,287,999 A * | 2/1994 | Olsen | 222/616 |
| 5,385,306 A * | 1/1995 | Cervenka | 239/663 |
| 5,485,963 A * | 1/1996 | Walto et al. | 239/663 |
| 6,502,771 B1 * | 1/2003 | Wyne | 239/663 |
| 6,637,678 B2 | 10/2003 | Wyne | |
| 6,907,832 B2 | 6/2005 | Wyne | |
| 7,063,280 B1 * | 6/2006 | Bogart et al. | 239/687 |
| 2006/0272308 A1 | 12/2006 | Moore | |
| 2007/0194155 A1 | 8/2007 | Kendall | |

* cited by examiner

*Primary Examiner* — Ryan Reis
(74) *Attorney, Agent, or Firm* — Charles D. Gunter, Jr.

(57) ABSTRACT

A riding lawn mower mounted drop spreader apparatus is used for spreading a granular material while mowing. The spreader includes a hopper for holding a quantity of a granular material to be dispensed with a control gate which controls the amount of material distributed while mowing. An auger located in the hopper has a drive motor which can also be controlled by an operator of the mower. The hopper has a mounting frame for mounting the hopper and agitator mechanism on a rear chassis region of the lawn mower. An operator can visually observe the amount of material distributed by observing the mowed path behind the mower during use.

10 Claims, 6 Drawing Sheets

LAWN MOWER AND FERTILIZER SPREADER COMBINATION

BACKGROUND OF THE INVENTION

A. Field of the Invention

The present invention relates generally to the field of grounds care systems and implements and, more particularly, to a drop spreader for granular material that is configured for attachment to the rear chassis region of a lawn mower, such as a zero turn lawn mower.

B. Description of the Prior Art

Granular material spreaders are used in a wide variety of applications both by individual consumers and in industrial ground keeping applications. They are commonly used for the distribution of fertilizers and insecticides but may also be used to distribute such things as top soil or sand in top dressing applications, as well as for distribution of ice control materials on walkways around buildings and landscaping. Such spreaders may be generally classified in two types, drop spreaders and broadcast or spinner spreaders.

Drop spreaders of the stand alone or towed type are well known in the art and typically include a hopper having a plurality of discharge openings or apertures formed in a bottom through which the granular material is discharged under the action of gravity. In addition, many drop spreaders have an adjustable door or gate which can be adjusted for selectively obscuring the discharge openings in the hopper, thereby restricting or interrupting the amount of granular material discharged. Furthermore, some drop spreaders also incorporate an agitator or other device for mechanically churning the granular material located above the discharge openings, thereby improving the material flow of material through the openings.

While such drop spreaders have performed satisfactorily in many applications over the years, they have not typically been associated with a lawn mowing device so that, for example, fertilizer is being distributed at the same time the area of grass is being mowed. In some cases, drop spreaders have been towed behind or pushed in front of various types of ground care mechanized equipment, but it the arrangement of the equipment did not readily indicate the path over which the fertilizer was spread or the degree of coverage obtained.

In contrast to drop spreaders, broadcast or spinner type spreaders include a rotating member for centrifugally dispersing or "casting" the material out away from the spreader. The amount and concentration of material disbursed is controlled by metering the amount of material delivered to the rotating member and/or adjusting the speed of the rotating member. Unfortunately, the typical broadcast spreader has not proven to be particularly accurate in delivering a precise amount of granular material over a particular area and, in general, is less accurate than the drop style spreader.

In addition to the above described different categories of spreaders, the prior art devices used as fertilizer/chemical/seed spreaders have primarily been separated into two entirely separate lines of equipment. In the first type of device, mowing and fertilizing are achieved as two separate tasks, requiring a separate spreader and mower. This component arrangement is essentially a repetitive, time consuming process in which the operations must be performed as two separate steps and not simultaneously.

In the case of the second type of device, some type of add-on configuration was utilized. In some instances, this type of device involved the integration of the spreader with the lawnmower, with the fertilizer being fed through the blade housing and distributed primarily by the action of the lawnmower blade while turning. This type arrangement has the disadvantage that it allows for extensive contact between the fertilizer and the mower or blade assembly, thereby allowing the possibility that corrosive reactions could occur between the chemicals being spread and the metallic surfaces of the lawnmower. Also, the action of the blades in this type of arrangement may provide less than adequate spreading of the fertilizer since the lawnmower was designed as a mowing device, rather than as a spreading device. It is also difficult to observe the path and quantity of the material being discharged where the fertilizer is being fed through the interior of the lawnmower body.

Other attempts at combining spreaders with lawn mowers have relied on the vibration and swinging movements of the spreader body itself to provide for spreading of the contents of the hopper. This type of system has obvious flaws in that the spread of the fertilizer is very erratic and uneven, and little control over the fertilizing process is possible.

The shortcomings of the prior art show the need for a spreader which is adaptable for mounting on a riding lawn mower, preferably of the zero turn radius type. The spreader should be easily removable from the riding lawn mower, for example, for maintenance or storage or to allow transfer from one mower to another. The system should also allow for the control of the rate at which fertilizer is spread and prevent any significant contact between the fertilizer and the lawnmower to prevent corrosive/chemical attack of the lawnmower. The spreader/lawn mower combination should allow the operator to easily observe the amount of granular material being distributed and see the path over which the distribution is taking place.

It is an aim of the present invention to meet these shortcomings of the prior art as described above, as will be set forth in greater detail in the written description which follows.

SUMMARY OF THE INVENTION

The present invention utilizes a drop spreader apparatus which can be mounted on a rear chassis region of a lawn mower for spreading a granular material while mowing. The preferred lawn mower is a zero turn mower having a fixed mowing width. The apparatus includes a hopper for holding a quantity of a granular material to be spread. The hopper has a generally vertical front wall and a slanted rear wall and opposing end walls which together with the front and rear walls define an initially open interior space for the hopper. The hopper front and rear walls meet in a bottom region in which is located at least one opening through which granular material can be distributed. Preferably, a series of apertures are provided in the bottom region of the hopper and constitute a discharge region for distributing the granular material.

A control gate is mounted adjacent the bottom region of the hopper for adjusting the relative size or number of open apertures in the bottom region to thereby selectively control the amount of granular material being distributed from the hopper interior space. An auger element is supported for rotation within the interior space of the hopper in proximity to the discharge region. An auger drive mechanism, including a source of driving torque, causes rotation of the auger element when placed in an active operating mode upon demand by an operator to break up the granular material in the hopper. The auger drive mechanism also has an inactive mode in which the auger does not rotate. An operator controlled drive actuator is provided for selectively shifting the auger drive mechanism between the two modes of operation. A dispensing control is also present for adjusting the position of the control gate relative to the discharge region located in the bottom region of the hopper to thereby control the amount of granular material being dispensed. The hopper apparatus includes a mounting frame having a front mounting wall and a pair of spaced apart end walls for mounting the hopper and agitator mechanism on a rear chassis region of the lawn mower. The front mounting wall of the mounting frame can typically be bolted to. Provided in a quick attach/detach configuration, or otherwise attached to the rear chassis region of the lawn mower.

In one preferred form of the invention, the auger drive mechanism includes a 12-Volt windshield washer motor with an output shaft connected to the auger element in operative fashion. The motor can be powered by wiring it to the lawn mower's starter battery located on the lawn mower chassis. The motor can be mounted on one of the spaced apart end walls of the mounting frame with the auger element running between mounting locations on each of the end walls. The auger drive actuator for the drive mechanism can conveniently be an electrical on/off switch.

The dispensing control for adjusting the position of the control gate relative to the discharge region of the hopper is preferably made up of a foot operated cable and hinge arrangement. The control cable has a first end which runs from a hinge mounted on the hopper to the control gate and has a second end which connects to a foot pedal located on the lawn mower. The mower operator uses the foot pedal to selectively control the position of the control gate and thereby control the amount of granular material being dispensed.

Additional objects, features and advantages will be apparent in the written description which follows.

DETAILED DESCRIPTION OF THE INVENTION

The preferred version of the invention presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
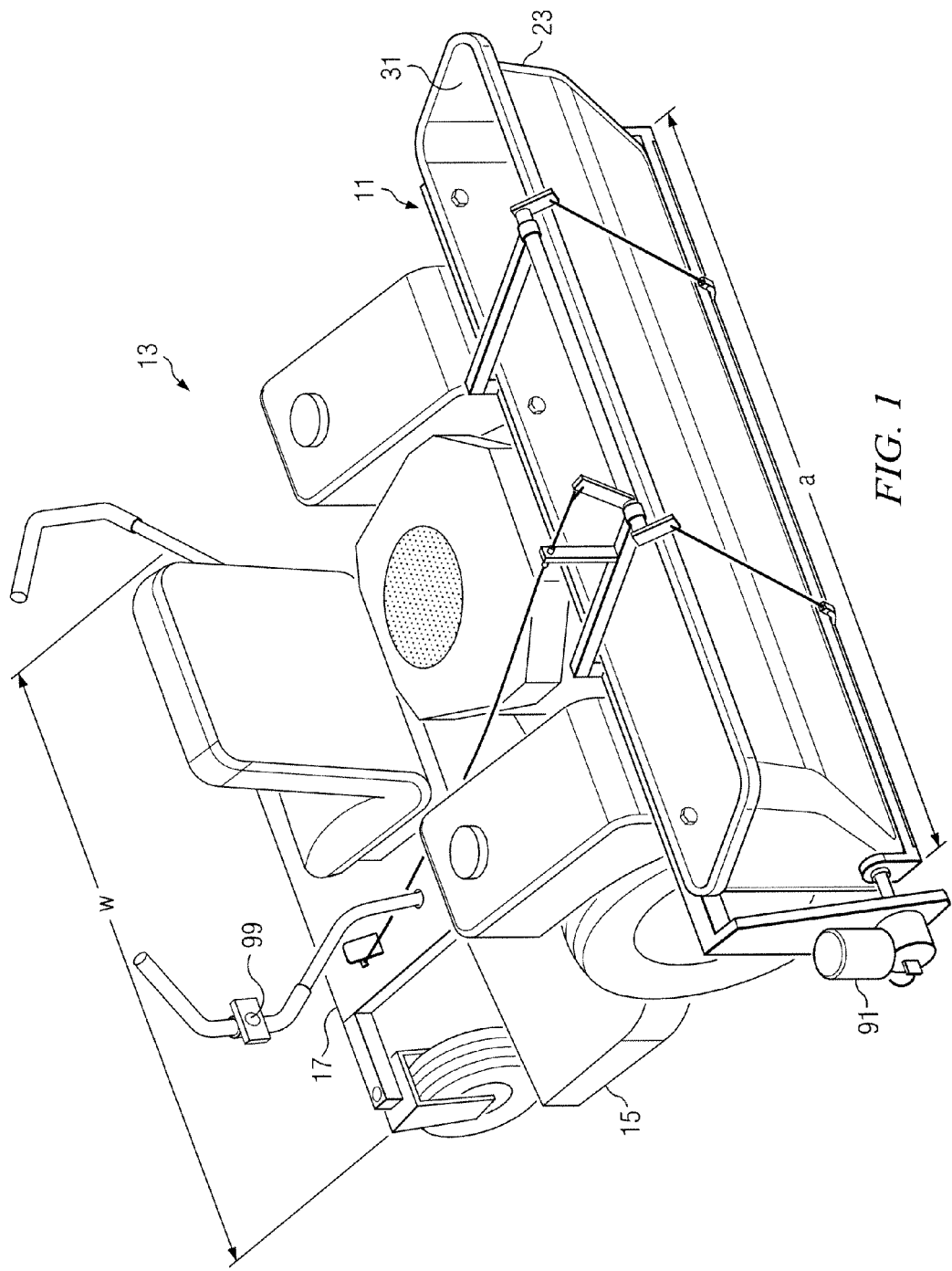
FIG. 1 is a perspective view of a zero turn radius lawn mower spreader combination of the invention having a drop spreader mounted on a rear portion of the chassis of the mower.

FIG. 1 shows a typical installation in which a drop spreader 11 is mounted to the rear chassis region of a zero turn lawn mower 13. The chassis of the zero turn lawn mower 13 has a front region 17, a rear chassis region (19 in FIG. 4) and opposing intermediate side regions 15 which together with the front and rear regions define a mowing width ("w" in FIG. 1) for the mower 13.

While it will be understood in the description which follows that the drop spreader arrangement of the invention could be used on a variety of types and styles of mowers, the preferred combination of the invention incorporates a zero turn lawn mower. By "zero turn" mower is meant that, while the mower is operationally similar to a standard riding lawn mower, the turning radius is essentially zero inches. Different brands and models achieve this in different ways. Most current models have four wheels, two swiveling front tires and two larger drive tires in the back. Instead of controlling the swiveling tires to steer the machine, the rotational speed of the drive tires differ in order to move one side faster than the other For most zero-turn mowers today, steering is simply changing the speeds of the drive tires. The tire speed is controlled by two levers that protrude on either side of the driver and typically extend over the lap. When both levers are pushed forward simultaneously with the same force, the mower moves forward; when both levers are pulled back simultaneously with the same force, the mower moves backward. Push one lever more than the other and the mower makes a gentle turn. Push one lever forward and pull the other backward and the mower pivots from the drive wheels, creating a zero-radius turn.

Operationally, the typical design of a zero-turn mower has each rear wheel connected to a hydrostatic transmission, i.e., a device that creates wheel rotation using pressurized fluid. Rotational force from the engine turns a pulley-operated pump that pressurizes the transmission fluid. When you move a steering/speed lever, you are controlling the flow of fluid through the transmission and the rotational speed or the forward/reverse direction of a drive wheel. Maximum lever movement means maximum fluid flow, which translates into a rapidly turning wheel. If one drive wheel turns more rapidly than the other, the machine moves along a curved path. If both wheels turn at the same speed, the machine follows a straight path. If one wheel stops and the other turns, or if the wheels turn in opposite directions, the mower pivots.

Figure 5:
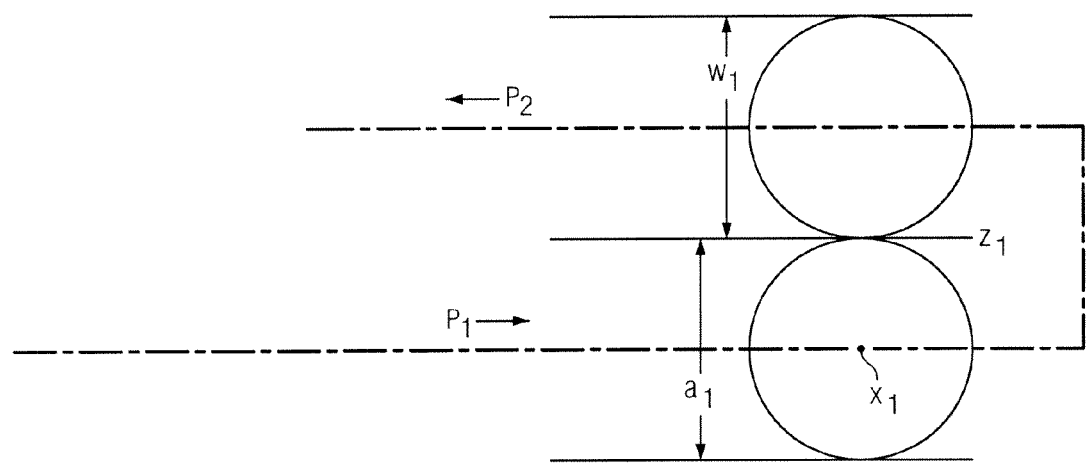
FIG. 5 is a schematic view of the path of travel of the lawn mower spreader combination of the invention over a work surface showing the distribution area of the fertilizer being spread.

Zero-turn mowers of the type described are designed to cut very closely around obstacles. These mowers pivot through 180 degrees without leaving any uncut grass. It is this feature, in combination with Applicant's drop spreader, that allows an operator to dispense granular material, such as fertilizer, while mowing, and with no "dead zone" of coverage for the fertilizer being dispensed. For example, with respect to FIG. 5, it will be appreciated that a zero turn mower moving along a path of travel "P" will have a mowing width "$w_1$" and a distribution area of the granular material "$a_1$". The mower could theoretically pivot 180 degrees about the pivot point "$x_1$" and return along the same path of travel (P in FIG. 5). Alternatively, the operator can manipulate the zero turn mower to achieve a return path "P2" which, in effect, assures the absence of any appreciable "dead zone" of missed coverage (indicated at "$Z_1$" in FIG. 5).

Figure 2:
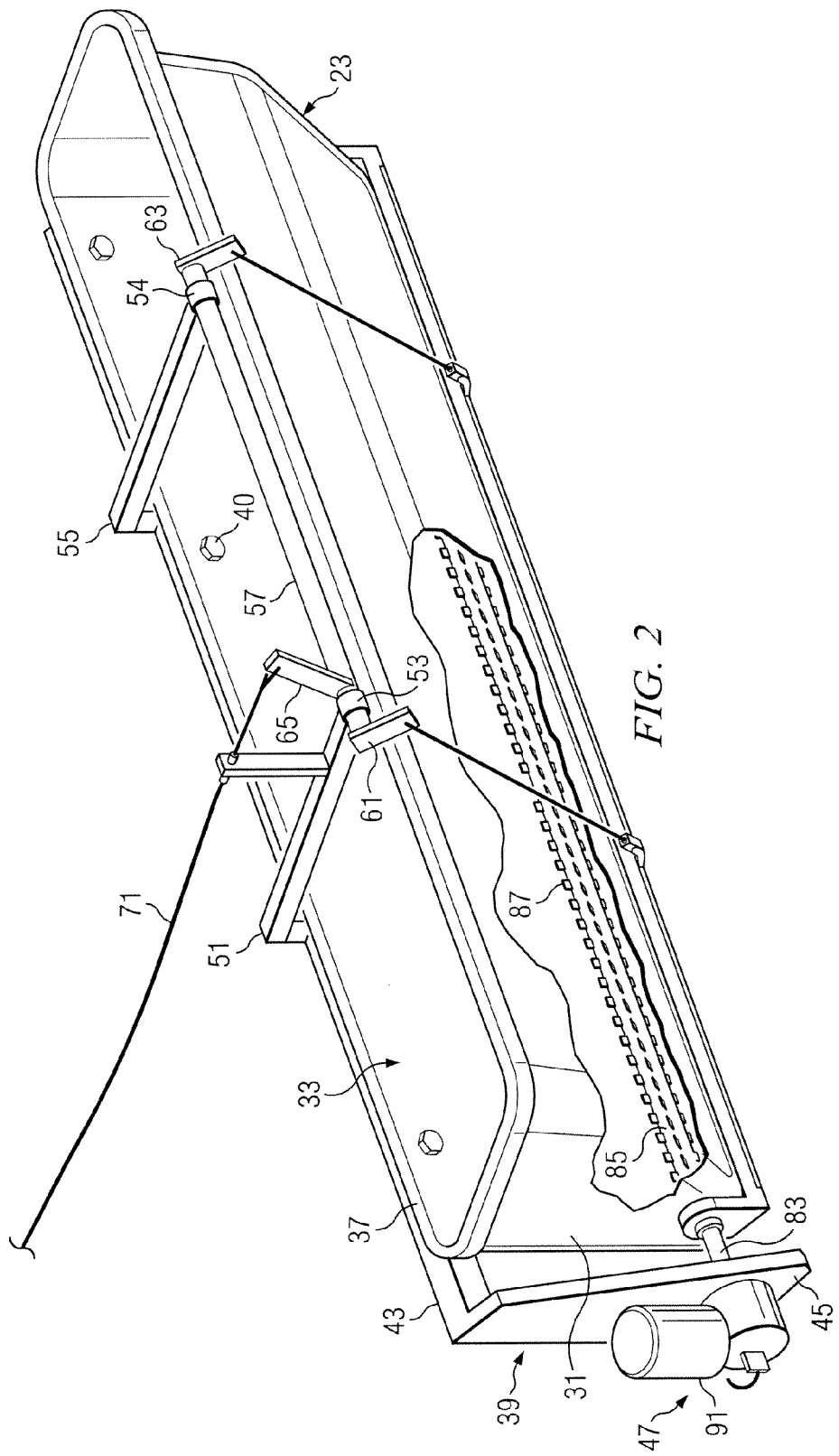
FIG. 2 is an isolated view, partly broken away for ease of illustration, of the drop spreader portion of the lawn mower/spreader combination of the invention.
Figure 3:
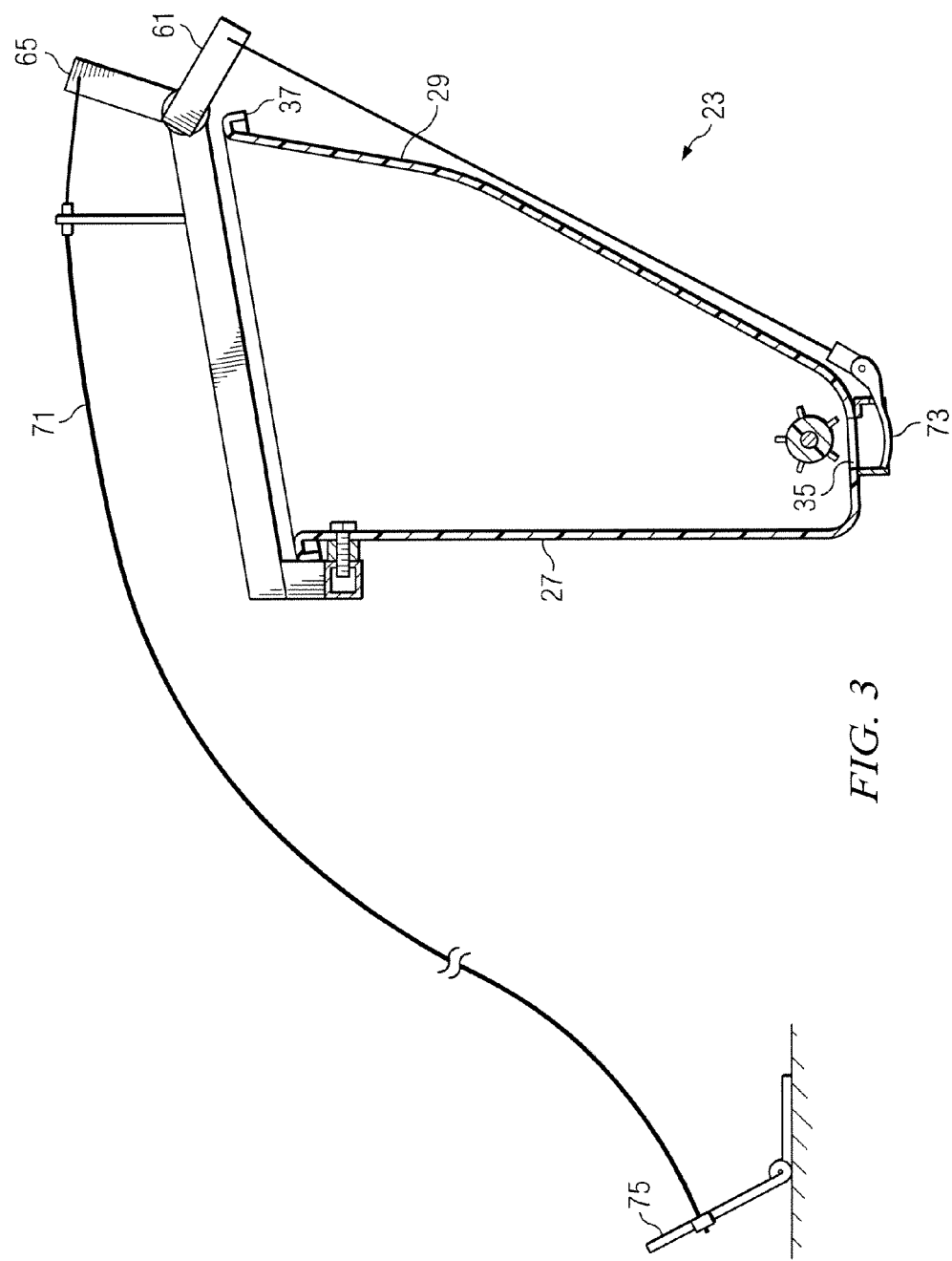
FIG. 3 is a an isolated side view, partly in section, of the spreader hopper of the mower/spreader combination of the invention.

Returning now to FIG. 1, the component arrangement of the combination mower and drop spreader will now be described in greater detail. As previously mentioned, the drop spreader 11 is mounted on the rear chassis region of the zero turn lawn mower 13. The hopper 23 is used to hold a quantity of a granular material, such as a typical commercially available lawn fertilizer. The mower width is illustrated as "w" while the distribution area of the drop spreader is illustrated as "a." As best seen in FIGS. 2 and 3, the hopper 23 has a generally vertical front wall 27, a slanted rear wall 29, and opposing end walls 31 which together with the front and rear walls define an initially open interior space (generally at 33 in FIG. 2) for the hopper 23. The hopper front and rear walls meet in a bottom region of the hopper in which is located at least one opening (35 in FIG. 3) through which granular material can be distributed. Preferably, the opening in the bottom region of the hopper comprises a longitudinally arranged series of apertures provided in the bottom region which constitute a discharge region for distributing the granular material. The hopper 23 can conveniently be formed from a synthetic plastic, such as an injection molded polyolefin or the like, and has an lip (37 in FIG. 2) around the upper edge formed by the four walls of the hopper 23.

A control gate (73 in FIG. 3) is mounted adjacent the bottom region of the hopper for adjusting the relative size or number of open apertures in the bottom region to thereby selectively control the amount of granular material being distributed from the hopper interior space. As will be appreciated from the foregoing discussion, the width of the hopper generally matches the mowing width of the zero turn lawn mower allowing full coverage of the mowed area with no "dead zones" of incomplete coverage.

Figure 4:
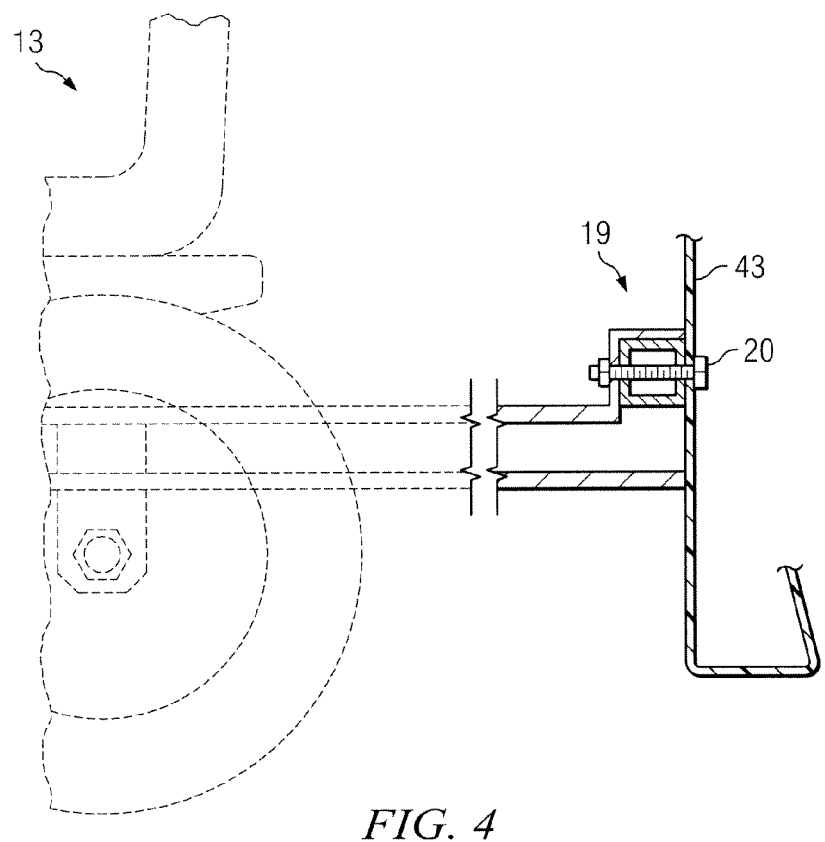
FIG. 4 is a simplified view of the rear chassis region of the mower showing the attachment point for the drop spreader, the mower chassis and wheels being shown in phantom lines.

A mounting frame (39 in FIG. 2) is provided for mounting the hopper 23 and an associated agitator mechanism on the rear chassis region of the zero turn lawn mower chassis. As shown in FIG. 2, the mounting frame 39 has a vertical front wall 43 and a pair of spaced apart end walls 45. The vertical front wall 43 allows the hopper to be mounted on the rear chassis region of the zero turn lawn mower in any convenient fashion. For example, FIG. 4 shows the front wall 43 of the mounting frame being bolted to the mower rear chassis region 19 by means of bolts 20, providing a more permanent or semi-permanent mounting arrangement.

As shown in FIG. 2, the width of the mounting frame 39 should be sufficient to support the hopper 23 with its associated drive mechanism (illustrated generally at 47 in FIG. 2). Attached to the mounting frame 39 are two horizontal support struts that are located above the hopper 23. The first horizontal member 51 is attached to the mounting frame 39 at one end of the member and has a sleeve 53 at the other end. The second horizontal member 55 is attached to the mounting frame 39 at one end of the member and has a sleeve 54 at an opposite end. A hinge element 57 is connected between the first and second horizontal members 51, 55 at the sleeves 53, 54, which allows rotational movement of the hinge element within the sleeves. As will be appreciated, movement of a control cable 71 causes the hinge element 57 to rotate which, in turn, causes the ears 61, 63 and 65, to pivot. This pivoting action causes the cable 71 to open and close the control gate (73 in FIG. 3). The tension on the cable 71 is controlled by the operator's use of a foot pedal (75 in FIG. 3), mounted on the mower chassis. The control gate 73 can thus be used to adjust the relative size of the apertures 35 in the bottom region of the hopper to thereby control the amount of granular material being distributed from the hopper interior space 33.

Figure 6:
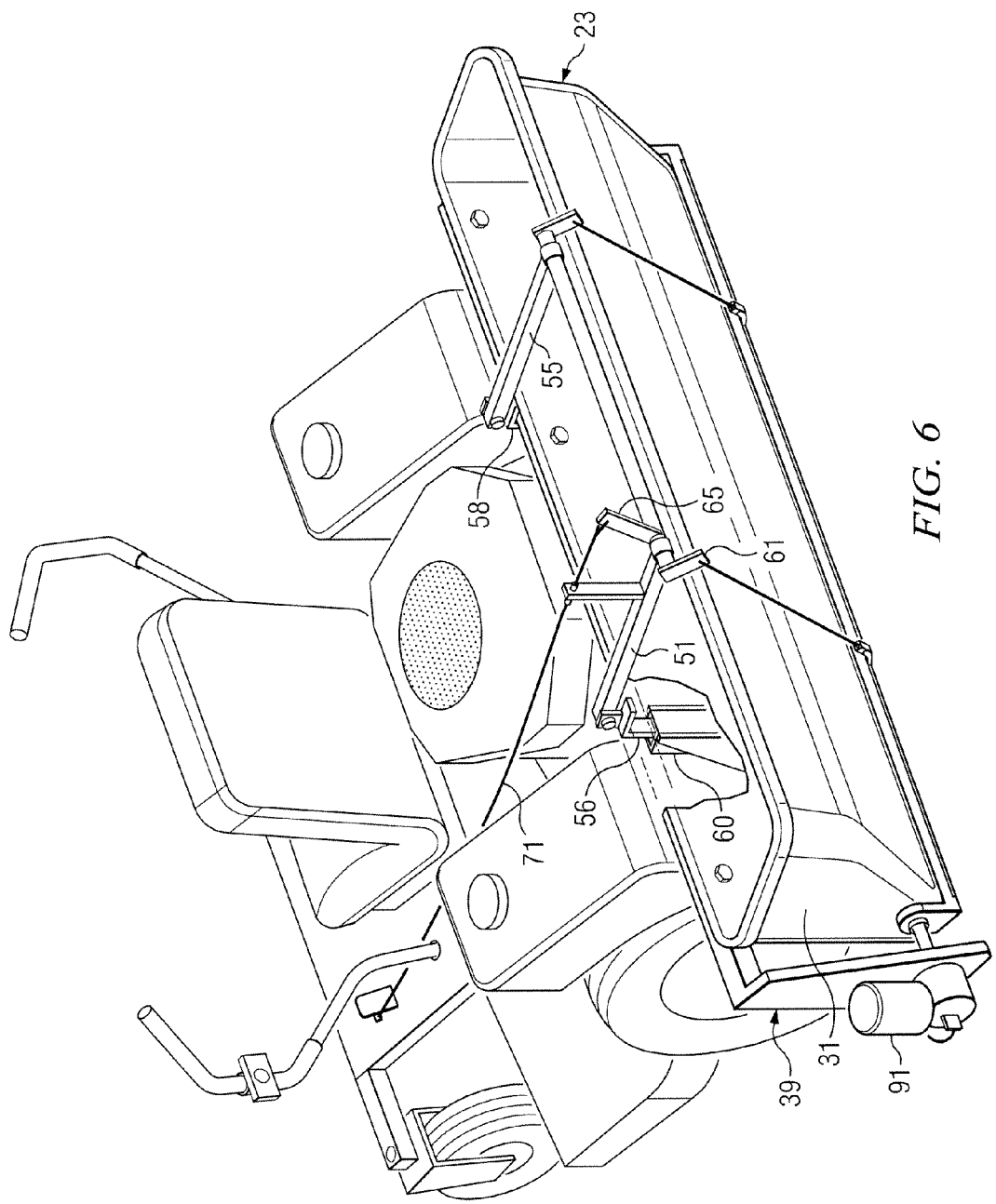
FIG. 6 is a perspective view, similar to FIG. 1, but showing portion of the spreader hopper and mounting frame broken away in order to illustrate a quick attach/detach configuration of the lawn mower spreader combination of the invention.
Figure 7:
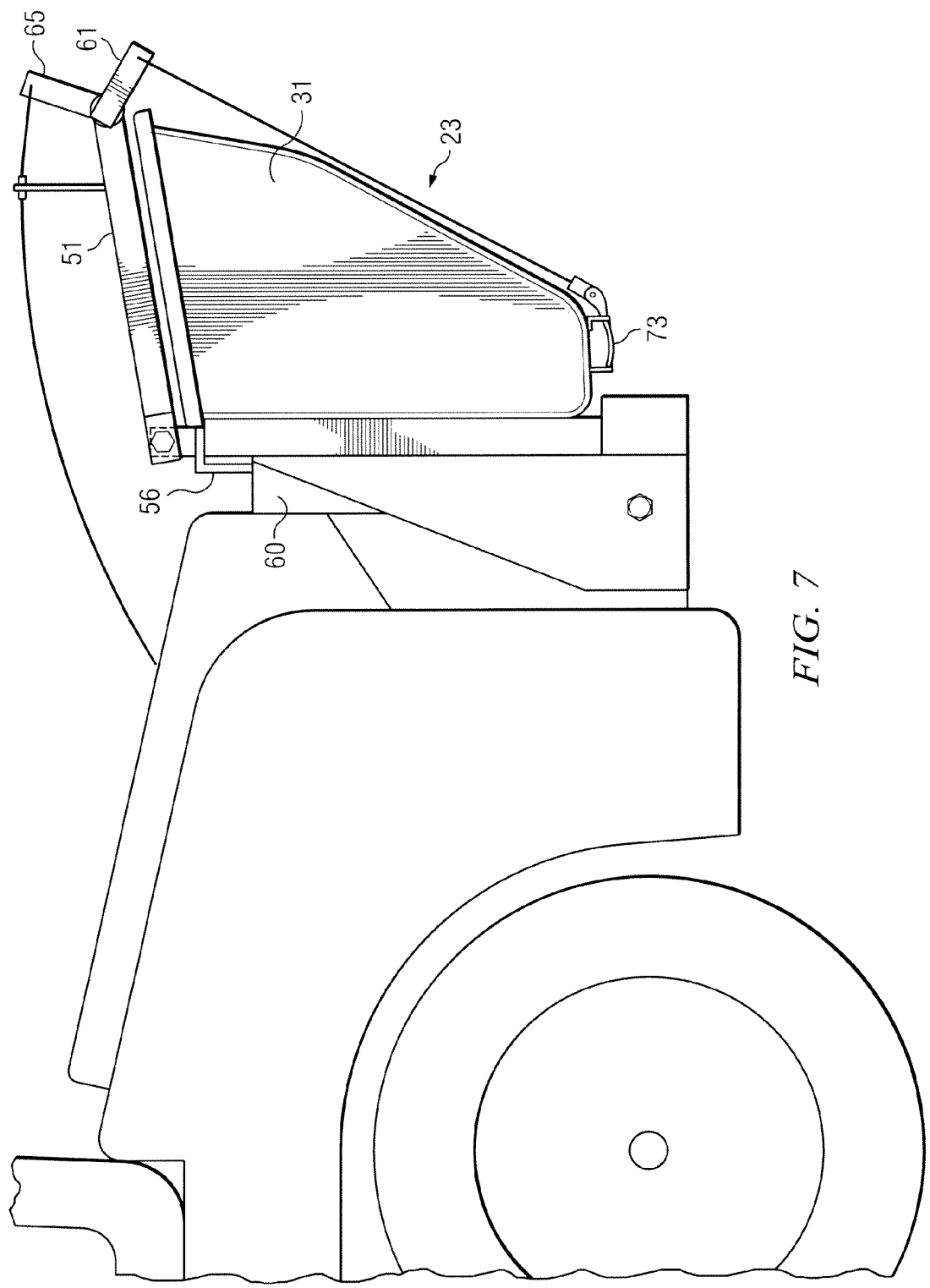
FIG. 7 is a close-up, side view of the hopper and mounting frame of FIG. 6, with the quick attach/detach components being used to mount the hopper on the riding lawn mower frame.

FIGS. 6 and 7 of the drawings illustrate another mounting configuration for the hopper 23 and mounting frame 39. As will be appreciated from FIG. 6, the first and second horizontal members 51, 53, have been provided with downwardly depending leg elements 56, 58, which are slightly spaced-apart from the mounting wall (as shown in the side view of FIG. 7) and which are adapted to be received in upstanding channel members (such as channel member 60 shown in the broken away view in FIG. 6). This component arrangement allows the hopper assembly to be easily lifted on and off the rear chassis of the mower. The entire spreader arrangement can be easily removed by simply detaching the cable 71 from the foot pedal (75 in FIG. 3) on the mower, detaching any electrical connections and then lifting the legs 56, 58 from the respective channel members 60.

An auger shaft (83 in FIG. 2) is supported between the opposing end walls of the hopper for rotation within a lower region of the hopper interior. The auger element 85 is supported for rotation within the interior space 33 of the hopper 23 in proximity to the apertures 35. As seen in FIG. 2, the auger surface has a plurality of tines 87 are arranged on the auger's outer surface to assist the auger in breaking up any clumps that form in the granular material. The auger shaft 83 is supported for rotation within the interior space 33 of the hopper 23 by means of a conventional set of bearings located in the end walls of the hopper. One end of the auger shaft 83 passes through the bearings and is connected to the drive mechanism 47.

The drive mechanism 47 can take any number of convenient forms and includes a source of driving torque for causing rotation of the auger element when placed in an active operating mode upon demand by an operator to break up the granular material in the hopper 23. The drive mechanism 47 also has an inactive mode in which the auger does not rotate. In the embodiment of the invention shown in FIG. 2, the drive mechanism 47 for the agitator 89 includes a 12-Volt windshield washer motor 91 with an output shaft connected to the agitator 89 in operative fashion. The motor is powered by electrical connection to the starter battery located on the chassis of the mower. The agitator motor 91 is mounted on one of the spaced apart end walls 39 of the mounting frame. A drive actuator is provided for selectively shifting the drive mechanism 47 between the two modes of operation. The drive actuator can be, for example, an electrical on/off switch (shown as 99 in FIG. 1).

It will be appreciated from FIG. 2 that the hopper and mounting wall with their related components comprise a modular unit which can be sold separately from the riding lawn mower and, as has been previously described, can be easily mounted and then later removed from the mower, especially when provided in the quick attach/detach configuration described with respect to FIGS. 6 and 7.

In operation, the mower/spreader combination of the invention is used to simultaneously mow and fertilize a substrate area with a zero turn lawn mower having a chassis with a front region, a rear region and opposing sidewalls which define a given mowing width therebetween. A drop spreader of the type previously described is mounted on the rear region of the lawn mower chassis. The drop spreader has a hopper for holding and distributing a granular material. The hopper also has a given spreading width which is approximately the same as the mowing width of the zero turn lawn mower. The lawn mower is operated to mow a path along the substrate area and is periodically turned to move in a reverse direction along a new mowing path which is parallel to the original mowing path and which effectively covers the area between the original path and the new path with no appreciable dead zones of coverage.

An invention has been provided with several advantages. The combination mower and spreader allows an operator to mow and fertilize at the same time, rather than requiring two separate operations. The incorporation of a drop spreader with a zero turn lawn mower allows full coverage of the area being mowed without any appreciable dead zones of missed coverage. It is easy for the operator to see exactly where the distribution of fertilizer or other granular material is taking place while mowing. The combination is relatively simple to implement and economical to manufacture from component parts readily available in the marketplace. The spreader and associated mounting frame can be provided with quick attach/detach components, allowing easy installation and removal of the spreader assembly from the lawn mower chassis.

While the invention has been shown in only one of its forms, it is not thus limited but is susceptible to various changes and modifications without departing from the spirit thereof.

What is claimed is:

1. A riding lawn mower mounted drop spreader combination for spreading a granular material while mowing, comprising:
    a hopper for holding a quantity of a granular material, the hopper having a generally vertical front wall and a slanted rear wall and opposing end walls which together with the front and rear walls define an initially open interior space for the hopper, the hopper front and rear walls meeting in a bottom region in which is located at least one opening through which granular material can be distributed;
    a control gate mounted adjacent the bottom region of the hopper for adjusting the relative size of the opening in the bottom region to thereby control the amount of granular material being distributed from the hopper interior space;
    an auger element supported for rotation within the interior space of the hopper in proximity to the opening in the bottom region of the hopper;
    a drive mechanism including a source of driving torque for causing rotation of the auger element when placed in an active operating mode upon demand by an operator to break up the granular material in the hopper, the drive mechanism also having an inactive mode in which the auger does not rotate;
    a drive actuator for selectively shifting the drive mechanism between the two modes of operation;
    a dispensing control for adjusting the position of the control gate relative to the opening located in the bottom region of the hopper to thereby control the amount of granular material being dispensed; and
    a mounting frame for mounting the hopper and agitator mechanism on a rear chassis region of the lawn mower;
    wherein the drive mechanism for the agitator includes a 12-Volt windshield washer motor with an output shaft connected to the auger shaft in operative fashion, the motor being electrically connected to a battery located on the lawn mower for powering the motor.

2. The combination of claim 1, wherein the mounting frame has a vertical front wall and a pair of spaced apart end walls, and wherein the agitator motor is mounted on one of the spaced apart end walls of the mounting frame, the auger element running between mounting locations on each of the end walls.

3. The combination of claim 2, wherein the drive actuator for the drive mechanism is an electrical on/off switch.

4. The combination of claim 3, wherein the dispensing control for adjusting the position of the control gate relative to the opening in the hopper includes a positioning cable and hinge arrangement, the control cable having a first end which runs to a hinge mounted on the hopper to the control gate and having a second end which connects to a foot pedal located on the lawn mower.

5. A combination zero turn lawn mower and granular material drop spreader, the combination comprising:
    a zero turn lawn mower having a chassis with a front region, a rear chassis region and intermediate side regions which together with the front and rear regions define a mowing width for the mower;
    a hopper for holding a quantity of a granular material, the hopper having a generally vertical front wall and a slanted rear wall and opposing end walls which together with the front and rear walls define an initially open interior space for the hopper, the hopper front and rear walls meeting in a bottom region in which is located at least one opening through which granular material can be distributed;
    a mounting frame for mounting the hopper and agitator mechanism on the rear chassis region of the zero turn lawn mower, the mounting frame having a vertical front wall and a pair of spaced apart end walls;
    a pair of downwardly extending leg elements carried by the hopper and mounting frame;
    a pair of upstanding channel members mounted on the lawn mower chassis, the channel members being spaced-apart a predetermined distance for receiving the respective downwardly extending leg elements in mating fashion to thereby provide a quick attachment/detachment point for the hopper and mounting wall on the lawn mower chassis;
    a control gate mounted adjacent the bottom region of the hopper for adjusting the relative size of the opening in the bottom region of the hopper to thereby control the amount of granular material being distributed from the hopper interior space;
    an auger element supported for rotation within the interior space of the hopper in proximity to the opening in the bottom region of the hopper;
    a drive mechanism including a source of driving torque for causing rotation of the auger element when placed in an active operating mode upon demand by an operator to break up the granular material in the hopper, the drive mechanism also having an inactive mode in which the auger does not rotate;
    a drive actuator for selectively shifting the drive mechanism between the two modes of operation; and
    a dispensing control for adjusting the position of the control gate relative to the opening located in the bottom region of the hopper to thereby control the amount of granular material being dispensed.

6. The combination of claim 5, wherein the drive mechanism for the agitator includes a 12-Volt windshield washer motor with an output shaft connected to the auger element in operative fashion, the motor being electrically connected to a battery located on the lawn mower for powering the motor.

7. The combination of claim 6, wherein the agitator motor is mounted on one of the spaced apart end walls of the mounting frame, and wherein the auger element runs between mounting locations on each of the end walls.

8. The combination of claim 7, wherein the drive actuator for the drive mechanism is an electrical on/off switch.

9. The combination of claim 8, wherein the dispensing control for adjusting the position of the control gate relative to the opening in the bottom region of the hopper is a positioning cable and hinge arrangement, the control cable having a first end which runs to a hinge mounted on the hopper to the control gate and having a second end which connects to a foot pedal located on the lawn mower.

10. A method of simultaneously mowing and fertilizing a substrate area with a zero turn lawn mower having a chassis with a front region, a rear region and opposing sidewalls which define a given mowing width therebetween, the method comprising the steps of:

mounting a drop spreader on the rear region of the lawn mower chassis, the drop spreader having a hopper for holding and distributing a granular fertilizer material, the hopper having a bottom region with a longitudinally arranged series of apertures provided in the bottom region, an interior space, and a given spreading width which is approximately the same as the mowing width of the zero turn lawn mower along the entire spreading width of the hopper;

providing a control gate mounted adjacent the bottom region of the hopper for adjusting the relative size of the apertures in the bottom region to thereby control the amount of granular fertilizer material being distributed from the hopper interior space;

providing an auger element supported for rotation within the interior space of the hopper in proximity to the apertures in the bottom region of the hopper;

providing a drive mechanism including a source of driving torque for causing rotation of the auger element when placed in an active operating mode upon demand by an operator to break up the granular fertilizer material in the hopper, the drive mechanism also having an inactive mode in which the auger does not rotate;

providing a drive actuator for selectively shifting the drive mechanism between the two modes of operation, the drive actuator being an electrical on-off switch located on the lawn mover chassis;

operating the lawn mower to mow a path along the substrate area while simultaneously discharging the fertilizer material through the longitudinally arranged series of apertures provided in the bottom region of the hopper which constitute a discharge region for distributing the granular fertilizer material by gravity through the apertures along the entire spreading width of the hopper;

turning the lawn mower periodically to move in a reverse direction along a new mowing path which is parallel to the original mowing path and which effectively covers the area between the original path and the new path with no appreciable dead zones of coverage, the discharged granular fertilizer material covering the entire mowing width of the zero turn lawn mower.

* * * * *